(12) United States Patent
Nakajima

(10) Patent No.: US 8,733,428 B2
(45) Date of Patent: May 27, 2014

(54) AIR CONDITIONING SYSTEM FOR VEHICLE

(75) Inventor: Hiroshi Nakajima, Hadano (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1189 days.

(21) Appl. No.: 12/646,663

(22) Filed: Dec. 23, 2009

(65) Prior Publication Data

US 2010/0163220 A1 Jul. 1, 2010

(30) Foreign Application Priority Data

Dec. 26, 2008 (JP) .................................. 2008-332757
Jun. 16, 2009 (JP) .................................. 2009-143365

(51) Int. Cl.
*F25B 29/00* (2006.01)

(52) U.S. Cl.
USPC ........... 165/233; 165/232; 165/231; 165/230; 165/41; 165/291

(58) Field of Classification Search
USPC ......... 165/202, 204, 230, 231, 232, 233, 271, 165/291, 41, 42
See application file for complete search history.

(56) References Cited

U.S. PATENT DOCUMENTS

| | | | | |
|---|---|---|---|---|
| 4,408,278 A | * | 10/1983 | Saito et al. ..................... | 165/204 |
| 4,744,511 A | * | 5/1988 | Kakehi et al. .................... | 236/13 |
| 5,511,724 A | * | 4/1996 | Freiberger et al. ........... | 236/49.3 |
| 6,422,062 B1 | * | 7/2002 | King et al. .................... | 73/29.01 |
| 6,971,584 B2 | * | 12/2005 | Schmitt et al. ............... | 236/44 R |
| 7,197,927 B2 | * | 4/2007 | Stauss et al. ............... | 73/335.02 |
| 7,214,911 B2 | * | 5/2007 | Kim et al. ..................... | 219/497 |
| 7,325,595 B2 | * | 2/2008 | Homan et al. ................. | 165/204 |
| 7,392,838 B2 | * | 7/2008 | Errington et al. ............. | 165/204 |
| 7,696,710 B2 | * | 4/2010 | Byrne et al. ................. | 318/444 |
| 7,770,433 B2 | * | 8/2010 | Rothacher et al. ........... | 73/29.05 |
| 7,788,935 B2 | * | 9/2010 | Jang et al. ....................... | 62/150 |
| 7,832,223 B2 | * | 11/2010 | Arshad et al. .................. | 62/180 |
| 7,900,464 B2 | * | 3/2011 | Aoki et al. .................... | 62/176.6 |
| 7,946,505 B2 | * | 5/2011 | Lynam et al. ............... | 236/44 C |
| 2005/0045322 A1 | * | 3/2005 | Yoshida et al. ............... | 165/202 |

(Continued)

FOREIGN PATENT DOCUMENTS

| | | |
|---|---|---|
| DE | 102004045839 B3 | 2/2006 |
| JP | 63180514 A | 7/1988 |
| JP | 7-232549 | 9/1995 |

OTHER PUBLICATIONS

European Search Report for European Patent Application No. 09180436.9-2423 dated Apr. 1, 2010 (5 pages).

(Continued)

*Primary Examiner* — Marc Norman
*Assistant Examiner* — Devon Russell
(74) *Attorney, Agent, or Firm* — Osha Liang LLP

(57) ABSTRACT

An air conditioning system of a vehicle including a controller and sensors in communication with the controller. The sensors include an interior temperature sensor for determining the temperature of the vehicle interior and an inner surface temperature sensor for determining the temperature of the inner surface of the vehicle's windshield. The controller determines a dew-point for the vehicle interior based on the sensed interior temperature. The controller adjusts the dew-point or the inner surface temperature based on a correction value, and performs a defogging operation when the temperature of the inner surface of the windshield is less than the dew-point, wherein the dew-point or the inner surface temperature is adjusted.

14 Claims, 7 Drawing Sheets

(56) References Cited

U.S. PATENT DOCUMENTS

| | | |
|---|---|---|
| 2005/0109498 A9* | 5/2005 | Schlecht et al. ............ 165/202 |
| 2005/0121185 A1* | 6/2005 | Yonekura et al. ............ 165/202 |
| 2006/0000597 A1* | 1/2006 | Errington et al. ............ 165/204 |
| 2006/0144581 A1* | 7/2006 | Kauf ............................ 165/202 |
| 2006/0289458 A1* | 12/2006 | Kim et al. ..................... 219/497 |
| 2007/0221371 A1* | 9/2007 | Ichikawa et al. ............ 165/204 |
| 2007/0235549 A1* | 10/2007 | Nakajima .................... 236/44 R |
| 2007/0277544 A1* | 12/2007 | Honda et al. ................ 62/228.3 |
| 2010/0138139 A1* | 6/2010 | Gibert et al. ................. 701/112 |
| 2013/0160986 A1* | 6/2013 | Hashigaya et al. ........... 165/202 |

OTHER PUBLICATIONS

English Patent Abstract of JP63180514 from esp@cenet, published Jul. 25, 1988 (1 page).

English Patent Abstract of DE102004045839 from esp@cenet, published Feb. 23, 2006 (1 page).

English Abstract from esp@cenet for Japanese patent application with Publication No. 7232549, Publication Date: Sep. 5, 1995, 1 page.

* cited by examiner

AIR CONDITIONING SYSTEM FOR VEHICLE

CROSS-REFERENCE TO RELATED APPLICATIONS

The present application claims priority from Japanese Patent Application No. 2008-332757, filed Dec. 26, 2008 and Japanese Patent Application No. 2009-143365, filed Jun. 16, 2009. The contents of both priority applications are hereby incorporated by reference in their entirety.

BACKGROUND OF THE DISCLOSURE

1. Field of the Disclosure

The present invention relates to an air conditioning system for a vehicle which is capable of defogging a window glass.

2. Description of the Related Art

Japanese Patent Application Laid-Open No. 7-232549 discloses an air conditioning apparatus for a vehicle which is adapted to suppress occurrence of fogging on a window glass (in the specification, a front windshield glass and a door glass are generically called "a window glass") in accordance with humidity in a passenger compartment of the vehicle. This related art discloses that a fogging prevention determination value for determining whether or not a window glass is fogged is corrected in accordance with a rate of change in humidity in the passenger compartment in order to suppress occurrence of fogging on the window glass due to a delay in response of a humidity sensor upon a rapid rise in temperature in the passenger compartment.

SUMMARY OF THE CLAIMED SUBJECT MATTER

In one aspect, the present disclosure relates to an air conditioning system for a vehicle, comprising a controller and a plurality of sensors in communication with the controller. The plurality of sensors include an interior temperature sensor for a vehicle interior and an inner surface temperature sensor for a windshield. The controller is configured to determine a dew-point for the vehicle interior based on the sensed interior temperature and further configured to adjust the dew-point or the inner surface temperature based on a correction value. The controller performs a defogging operation when the inner surface temperature is less than the dew-point, wherein the dew-point or the inner surface temperature is adjusted.

In another aspect, the present disclosure relates to an air conditioning system for a vehicle, comprising a controller and a plurality of sensors in communication with the controller. The plurality of sensors include a means for sensing a temperature of an interior of the vehicle and a means for sensing an inner surface temperature of a windshield of the vehicle. The controller is configured to determine a dew-point of the interior of the vehicle from the sensed interior temperature and further configured to adjust the dew-point or the inner surface temperature using a means for correction. The controller performs a defogging operation when the inner surface temperature is less than the dew-point, wherein the dew-point or the inner surface temperature is adjusted.

In another aspect, the present disclosure relates to a method of defogging vehicle window glass. The method comprises, determining a temperature of a vehicle interior, determining a dew-point based on the determined temperature, determining an inner surface temperature of a windshield, adjusting the dew-point or the inner surface temperature based on a correction value, comparing the inner surface temperature to the dew-point, and performing a defogging operation when the inner surface temperature is less than the dew-point, wherein the dew-point or the inner surface temperature is adjusted.

BRIEF DESCRIPTION OF DRAWINGS

Features of the present disclosure will become more apparent from the following description in conjunction with the accompanying drawings.

DETAILED DESCRIPTION

Figure 1:
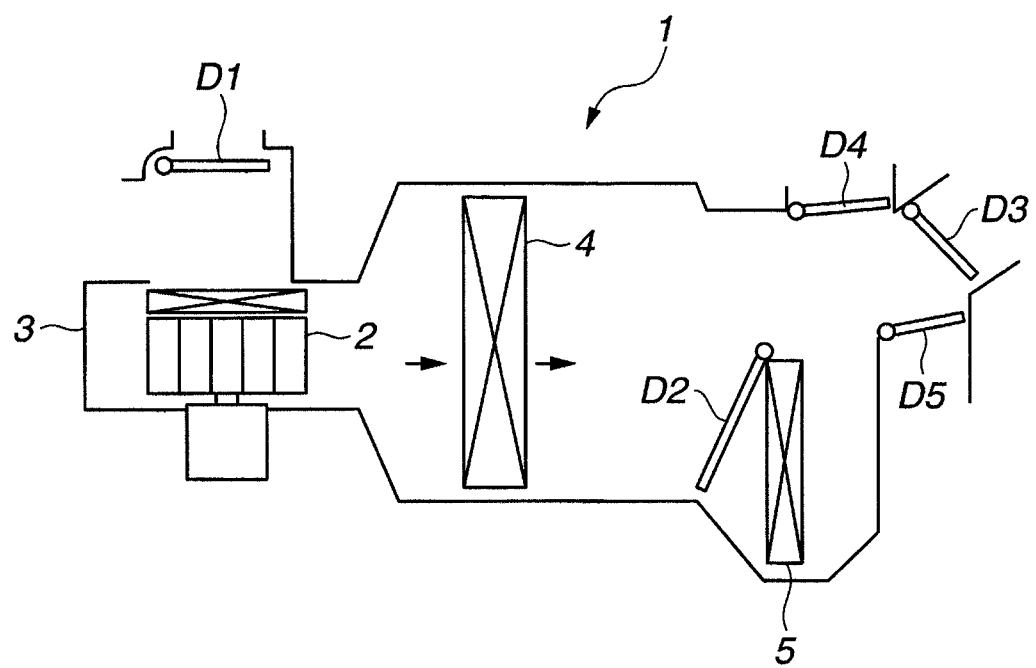
FIG. 1 is a schematic diagram illustrating a construction of an air conditioning system for a vehicle according to an exemplary embodiment of the present disclosure.

A construction and operation of an air conditioning system for a vehicle according to an exemplary embodiment of the present disclosure will be explained hereinafter by referring to the accompanying drawings.

Construction of Air Conditioning System for a Vehicle

In vehicular air conditioning system 1 blower fan 2 may be rotated and an inside air (recirculated air) or an outside air (fresh air) may be sucked into air conditioning unit 3 through inside/outside air (recirculation/fresh air) switching door D1. A pressurized refrigerant may be transmitted to evaporator 4 by driving compressor 12 (see FIG. 2), and the air sucked into air conditioning unit 3 may pass through evaporator 4 to thereby be dehumidified and cooled. The air passing through evaporator 4 may be divided into a part thereof which may pass through heater core 5 to thereby be heated, and the remaining part thereof which may bypass heater core 5 in the cooled condition, at a ratio according to an opening of air-mix door D2. The part that may pass through heater core 5 and the remaining part that may bypass heater core 5 may be mixed with each other downstream from heater core 5, so that an air-conditioned wind may be generated. The air-conditioned wind may be blown from a vent outlet port, a defroster outlet port, or a foot outlet port which may be exposed to an inside of a passenger compartment of the vehicle, via vent door D3, defroster door D4, and foot door D5, respectively, which may be opened and closed in accordance with a plurality of air conditioning modes.

In a vent mode, a defroster mode, and a foot mode, vent door D3, defroster door D4, or foot door D5 may be opened, respectively. In a bilevel mode, vent door D3 and foot door D5 may be opened. In a def-foot mode, defroster door D4 and foot door D5 may be opened. Blower fan 2 and respective doors D1 to D5 may be driven by actuator 13 (see FIG. 2), which may be a motor. A windshield defroster outlet port (a front defroster) may be disposed on an upper surface of an instrument panel near a lower end portion of front windshield glass 17 along a width direction of the vehicle. Blowing of the air-conditioned wind from the windshield defroster outlet port may remove fogging of front windshield glass 17. Further, a side defroster outlet port (a side defroster) may be disposed at both end portions of the instrument panel in the width direction of the vehicle and may blow the air-conditioned wind toward a door glass.

Construction of Control System

Figure 2:
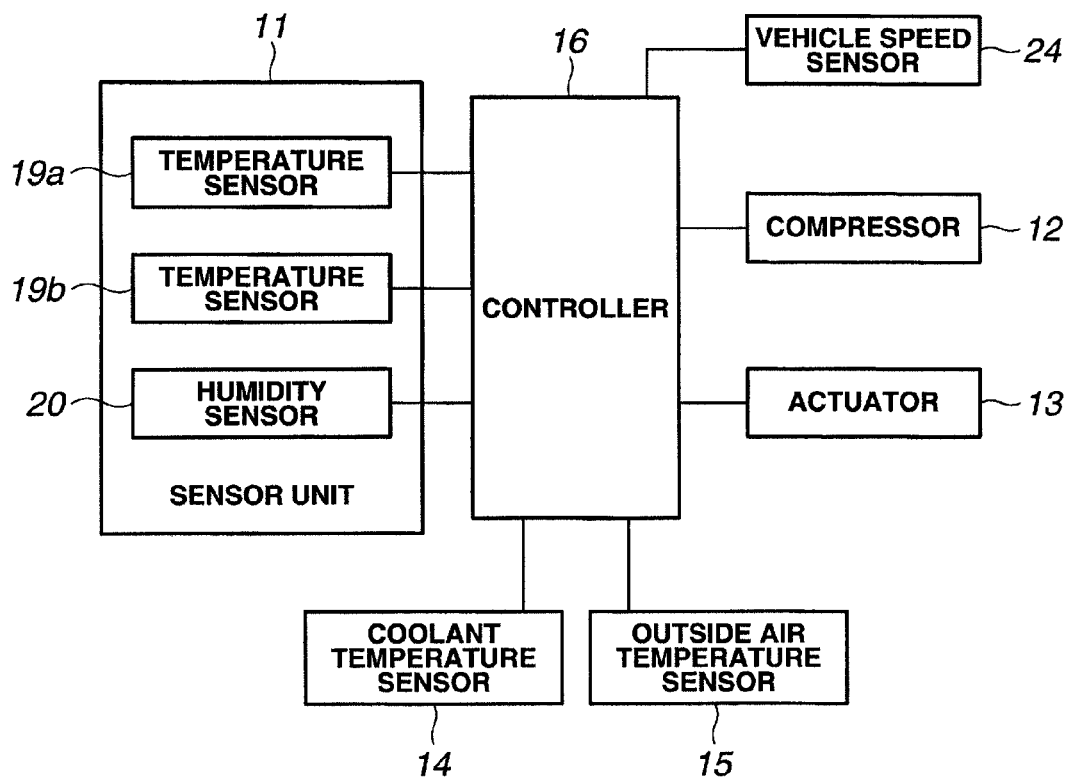
FIG. 2 is a block diagram illustrating a control system of the air conditioning system shown in FIG. 1.
Figure 3A:
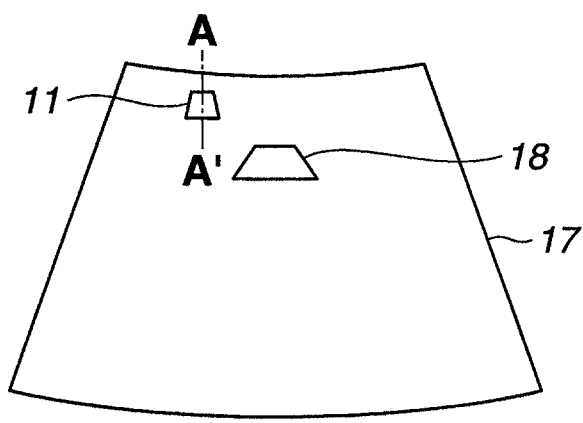
FIG. 3A is a diagram illustrating a layout of a sensor unit shown in FIG. 2.
Figure 3B:
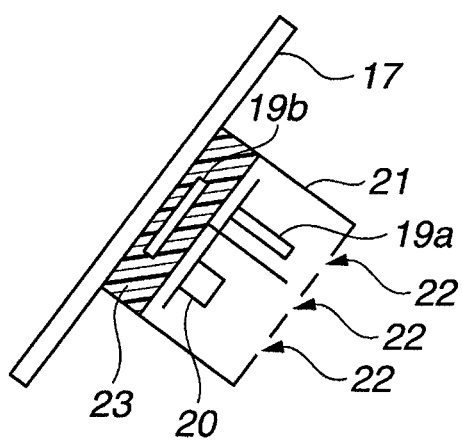
FIG. 3B is a sectional view of the sensor unit along the line A-A of FIG. 3A.

The control system for controlling vehicular air conditioning system 1 may include sensor unit 11, compressor 12, actuator 13, coolant temperature sensor 14, outside ambient air temperature sensor 15 all in communication with controller 16, as shown in FIG. 2. As shown in FIGS. 3A and 3B, sensor unit 11 may, preferably, be disposed in a position on an inside surface of front windshield glass 17 which may be apart from the defroster outlet ports (at a lower side of the windshield) as far as possible and may be allowed to be free from exposure to the defroster wind. For example, sensor unit 11 may be mounted to a portion of front windshield glass 17 which may be in the middle in the width direction of the vehicle and near a mounting site of rearview mirror 18 at an upper end portion of front windshield glass 17. As shown in FIG. 3B, sensor unit 11 may include temperature sensor 19a that may detect temperature Tga of vehicle inside air in the vicinity of front windshield glass 17, temperature sensor 19b that may detect temperature Tg of an inner surface of front windshield glass 17, and humidity sensor 20 that may detect humidity RH of the vehicle inside air in the vicinity of front windshield glass 17. Sensor unit 11 may include additional sensors and may also be located anywhere within the passenger compartment of the vehicle. Additionally, the sensors may be located throughout the passenger compartment, but may not be in a single sensor unit 11, but may be in multiple sensor units.

Temperature sensors 19a and 19b and humidity sensor 20 may be disposed on an inside of generally box-shaped body 21. Holes 22, which may be provided for introducing the inside air to the sensor elements, may be formed in an upper surface of box-shaped body 21. Box-shaped body 21 may have an elastic resin film 23 on a bottom surface thereof, to which temperature sensor 19b may be fixed. Temperature sensors 19a and 19b may both, preferably, be constituted of thermistors, but may also be any means of measuring temperature. Temperature sensors 19a and 19b and humidity sensor 20 may output signals to controller 16 via a harness (not shown).

Additional sensors located throughout the vehicle may also be in communication with controller 16. For example, coolant temperature sensor 14 may detect engine coolant temperature Tw in the vehicle, and outside ambient air temperature sensor 15 may detect temperature Tam of ambient air outside of the vehicle. Additionally, vehicle speed sensor 24 may detect the speed of the vehicle and may output a value indicative of the detected vehicle speed to controller 16.

Signals from the plurality of sensors, including coolant temperature sensor 14, outside ambient air temperature sensor 15, temperature sensors 19a and 19b, and humidity sensor 20 may be input to controller 16. Controller 16 may perform processing, as described later, based on the signals from these sensors and may output control signals to compressor 12 and actuator 13.

Controller 16 may include a timer or clock, a memory for storing values output from the plurality of sensors and predetermined values, and a processor to calculate rates and compare values.

Further, controller 16 may receive other signals necessary for air conditioning control. For example, signals from a solar radiation sensor for detecting an amount of solar radiation, an air intake temperature sensor for detecting an air intake temperature of the air after passing through evaporator 4, and a setting device for setting a target temperature in the passenger compartment. Illustrations and further discussion of these sensors and device, or any other sensors and devices, are omitted, but may be incorporated into the air conditioning system described herein.

Defogging Operation

Figure 4:
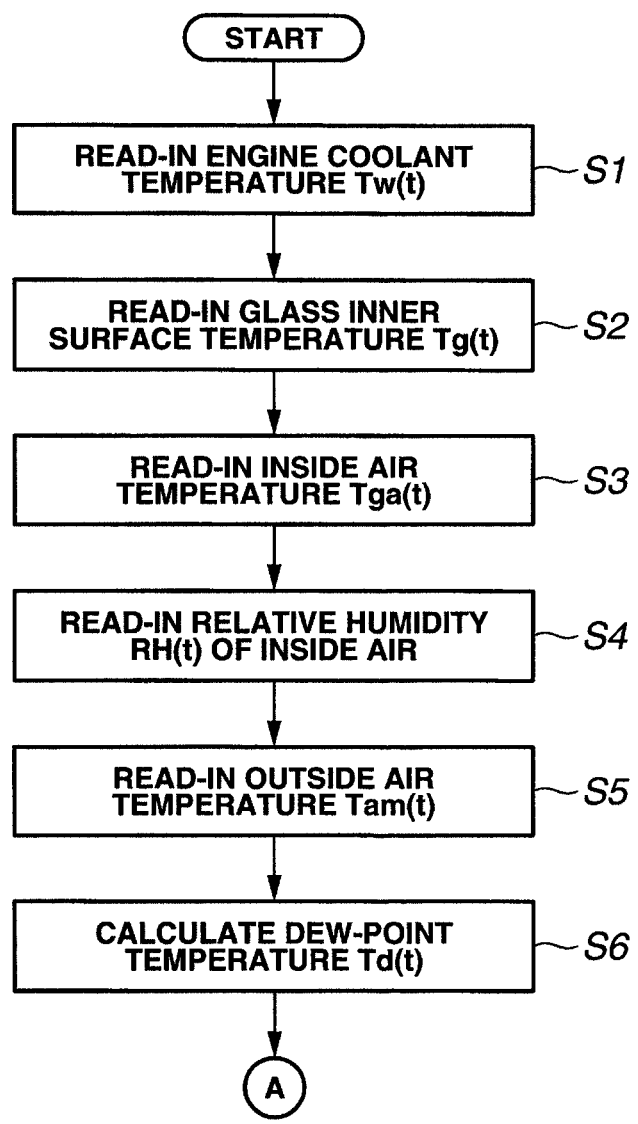
FIG. 4 is a flowchart illustrating an operation of defogging according an exemplary embodiment of the present disclosure.
Figure 5:
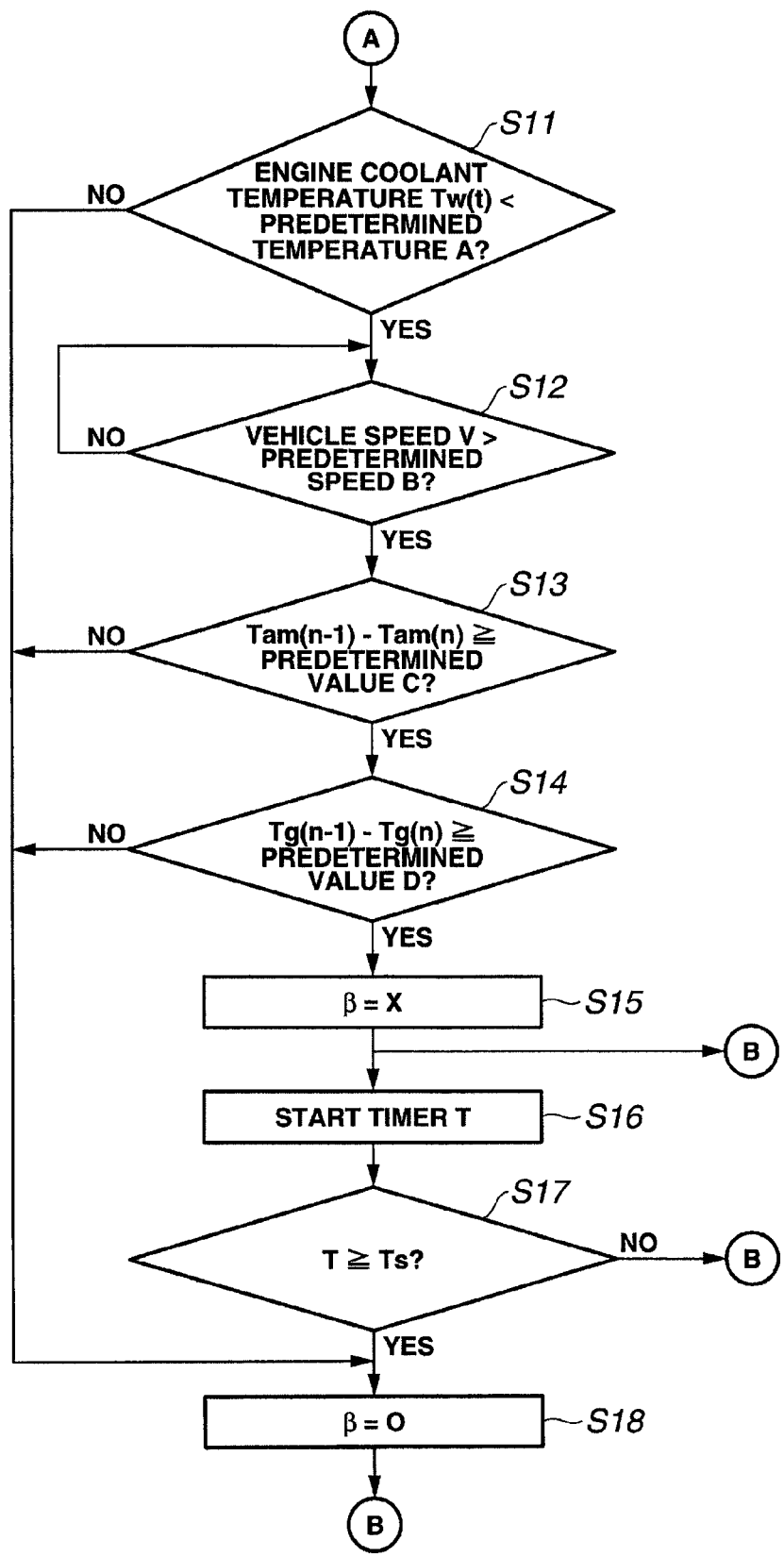
FIG. 5 is a flowchart illustrating an operation to be performed after the flowchart shown in FIG. 4.
Figure 6:
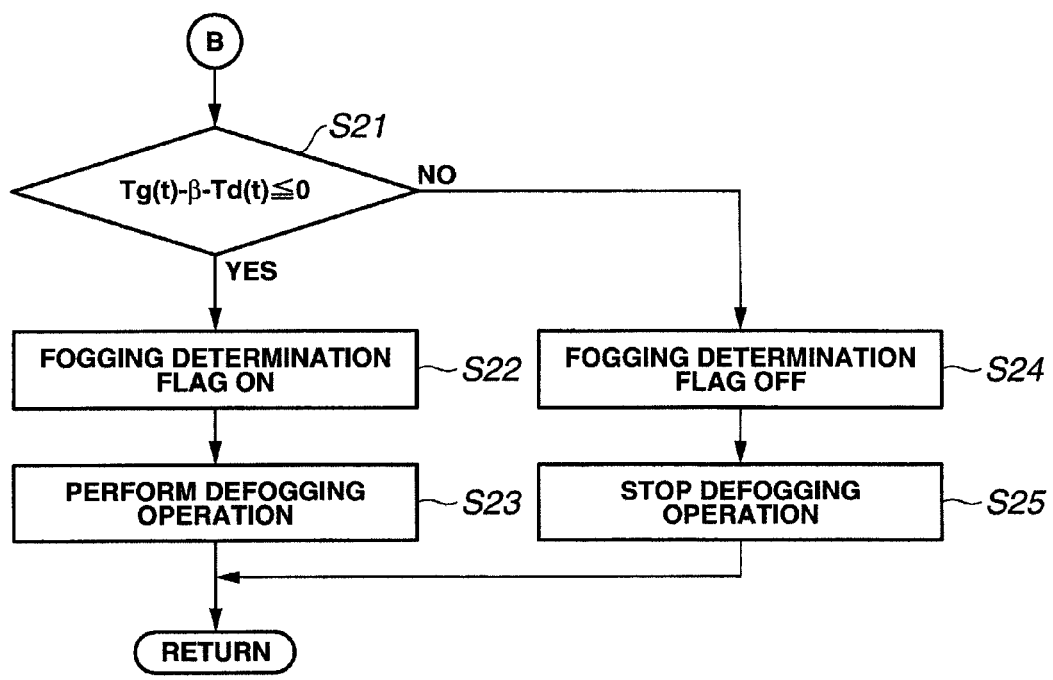
FIG. 6 is a flowchart illustrating an operation to be performed after the flowchart shown in FIG. 5.

The thus constructed vehicular air conditioning system 1 may suppress fogging of a window glass (particularly, a door glass) due to change in the outside air temperature by performing the following defogging operation, explained by referring to the flowcharts shown in FIGS. 4-6. The flowcharts shown in FIGS. 4-6 illustrate a routine of the defogging operation which may be repeatedly performed by controller 16 at predetermined intervals.

A description of a vehicle being first turned on is described below. However, the process as described may be continuously operated to perform the defogging operation during operation of the vehicle.

In the flowchart shown in FIG. 4, the routine may be started at the time (t=0) when an ignition switch of the vehicle is turned from the OFF state to the ON state (that is, at the time of start-up of the vehicle).

In step S1, controller 16 may detect engine coolant temperature Tw(t) through coolant temperature sensor 14. In step S2, controller 16 may detect inner surface temperature Tg(t) of front windshield glass 17 through temperature sensor 19b. In step S3, controller 16 may detect inside air temperature Tga(t) in the vicinity of front windshield glass 17 through temperature sensor 19a. In step S4, controller 16 may detect relative humidity RH(t) of the inside air in the vicinity of front windshield glass 17 through humidity sensor 20. In step S5, controller 16 may detect temperature Tam(t) of ambient air outside of the vehicle through outside air temperature sensor 15. In step S6, controller 16 may calculate dew-point temperature Td(t) in the vicinity of front windshield glass 17 by using the following mathematical expression:

$$Td(t) = \frac{4075.16}{18.75 - \ln\left(\frac{RH(t)}{100} e^{18.75 - \frac{4075.16}{Tga(t)+236.52}}\right)} - 236.52.$$

In steps S1-S6, variable t is a time when the process is executed. Throughout the operation of the vehicle the process may be executed n times. The operation may be executed at any time interval, for example, every 0.5 seconds.

In step S11, controller 16 may determine whether or not engine coolant temperature Tw(t) detected in step S1 may be less than predetermined temperature A. As a result of the determination, in a case where engine coolant temperature Tw(t) may be less than predetermined engine coolant temperature A, controller 16 may determine that a period of time during which the vehicle may be in the OFF state may be long and there may be a high possibility that a temperature difference between the front window glass and the door glass may be increased. The routine may then proceed to step S12. On the other hand, in a case where engine coolant temperature Tw(t) may be greater than predetermined temperature A, controller 16 may determine that the period of time during which the vehicle may be in the OFF state may be short and there may be a low possibility that the temperature difference between the front window glass and the door glass may be increased. The routine may then proceed to step S18. Further, if the vehicle is already in the ON state, the controller 16 may determine that Tw(t) is greater than predetermined engine coolant temperature A. In this case, the routine may proceed to step S18.

Although in this embodiment, controller 16 may detect the engine coolant temperature in order to determine a length of the period of time during which the vehicle may be in the OFF state, controller 16 may determine the length of the period of time during which the vehicle may be in the OFF state by using other methods such as actual measurement of the period of time during which the vehicle may be in the stopped state, which may be determined by the timer or clock of controller 16, or by an independent timer or clock. In this case, controller 16 may determine if the vehicle has been in the OFF state for a predetermined time. If it is greater than a predetermined time, then the routine may proceed to step S12. However, if it is less than a predetermined time, then the routine may proceed to step S18.

In step S12, controller 16 may determine whether or not vehicle speed V may be greater than predetermined speed B, and thereby may determine whether or not the vehicle may be started to shift from a stopped state to a moving state. At a time when vehicle speed V may become greater than predetermined speed B, controller 16 may determine that the vehicle may be started to shift from the stopped state to the moving state and proceed to step S13.

In step S13, controller 16 may determine a rate of change in the ambient air outside of the vehicle. The rate may be obtained by dividing the difference between a current detected temperature value and a previous detected temperature value by a time interval between the previous detection and the current detection. Specifically, outside ambient air temperature value Tam(n−1) of the ambient air outside of the vehicle, which may have been detected in a previous processing in step S5, and outside ambient air temperature value Tam(n) of the ambient air outside of the vehicle, which may have been detected in a current processing in step S5, are compared. In this calculation, n is the current processing operation. This difference is then divided by the time interval between temperature measurements. Controller 16 may then compare the rate of change of the ambient air outside the vehicle with a predetermined value C. As a result of the determination, in a case where the rate of change may be greater than predetermined rate C, controller 16 may proceed to the processing in step S14. On the other hand, in a case where the rate of change may be less than predetermined value C, controller 16 may proceed to the processing in step S18.

In step S14, controller 16 may determine a rate of change in the inner surface temperature of front windshield 17. The rate may be obtained by dividing the difference between a current detected temperature value and a previous detected temperature value by a time interval between the previous detection and the current detection. Specifically, inner surface temperature value Tg(n−1) of front windshield glass 17, which may have been detected in a previous processing in step S2, and inner surface temperature value Tg(n) of front windshield glass 17, which may have been detected in a current processing in step S2, are compared. This difference is then divided by the time interval between temperature measurements. Controller 16 may then compare the rate of change of the inner surface temperature with a predetermined value D. As a result of the determination, in a case where the rate of change may be greater than predetermined value D, controller 16 may proceed to the processing in step S15. On the other hand, in a case where the rate of change may be less than predetermined value D, controller 16 may proceed to the processing in step S18.

In step S15, controller 16 may set correction value β for a fogging prevention determination value to predetermined value X, where X is non-zero. The predetermined value X may be preset in controller 16 and may be determined based on a difference in heat resistance between front windshield glass 17 and the door glass.

Following step S15, the process may proceed to begin the process designated in FIG. 6. Additionally, in step S16, controller 16 may switch the timer of controller 16, for counting an elapsed time (count value), from the OFF state to the ON state.

Figure 7:
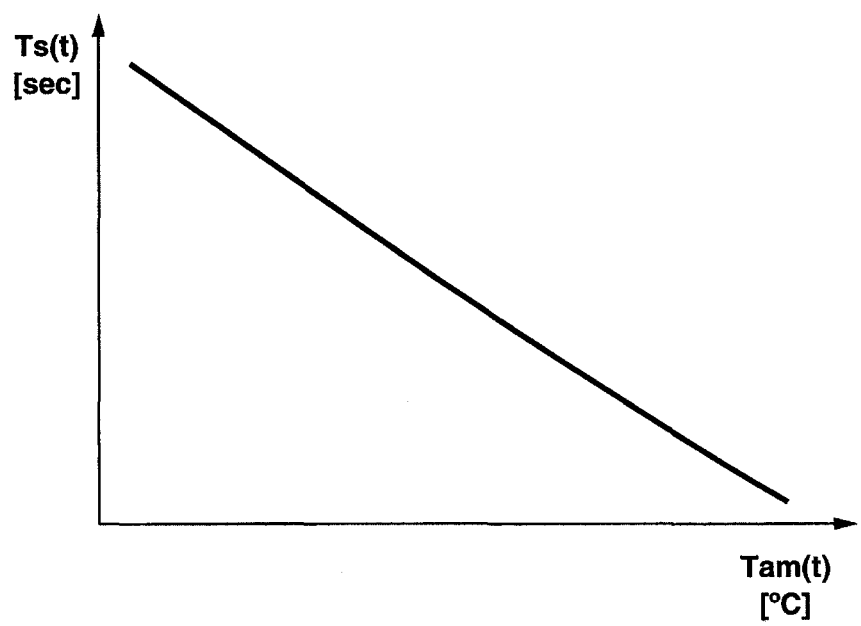
FIG. 7 is a graph illustrating a relationship between predetermined time Ts and temperature Tam of an outside ambient air which may be used in step S17, as shown in FIG. 5.

In step S17, controller 16 may determine whether or not a count value T of the timer may be greater than predetermined value Ts. Predetermined value Ts may be a value that may be decreased with an increase in temperature Tam(t) of the ambient air outside of the vehicle and may be set and adjusted by controller 16 accordingly, as illustrated in FIG. 7.

When count value T of the timer is greater than predetermined value Ts, controller 16 may proceed to the processing in step S18. In other words, S18 is processed when the time to reach predetermined time Ts may have elapsed since controller 16 set correction value β for the fogging prevention determination value to predetermined value X. In a case where it may be determined that predetermined time Ts may not have elapsed, controller 16 may proceed to the processing as detailed in FIG. 6, as detailed below.

In step S18, controller 16 may set correction value β for the fogging prevention determination value to zero. The process may then proceed to the procedure as shown in FIG. 6.

In step S21, controller 16 may compare inner surface temperature Tg(t) of front windshield glass 17, which may have been detected in step S2, with a threshold fogging prevention determination value. The threshold fogging prevention determination value may be obtained by adding correction value β to dew-point temperature Td(t) calculated in step S6. Controller 16 may then determine whether or not inner surface temperature Tg(t) of front windshield glass 17 may be less than the threshold fogging prevention determination value. In a case where inner surface temperature Tg(t) of front windshield glass 17 may be less than the threshold fogging prevention determination value controller 16 may proceed to the processing in step S22. On the other hand, in a case where inner surface temperature Tg(t) of front windshield glass 17 may be greater than the threshold fogging prevention determination value controller 16 may proceed to the processing in step S24.

In step S22, controller 16 may determine that there may be a possibility of fogging of the window glass and may set a fogging determination flag to the ON state.

In step S23, controller 16 may output a control signal to either one or both of compressor 12 and actuator 13 and may perform such an air conditioning operation as to defog the window glass (i.e., a defogging operation). Specifically, fogging on the window glass may be removed by decreasing the dew-point temperature near the inner surface of the window glass by blowing a dehumidified air across the window glass, or by increasing the outer surface temperature of the window glass by blowing out an air having a relatively high temperature across the window glass. Therefore, controller 16 may perform any one of the following operations (a)-(e) or any combination thereof, during step S23:

(a) change the air conditioning mode to the mode which allows air blowing from the defroster outlet port (i.e. defroster mode or def-foot mode);
(b) increase an amount of the defroster output by increasing a rotational speed of blower fan 2;
(c) increase a temperature of the air blown from the defroster outlet port by regulating the opening of the air-mix door D2;
(d) in a case where inside air recirculation is conducted, shift from the inside air recirculation to outside (fresh) air introduction by operation of inside/outside air switching door D1; and
(e) blow dehumidified air by turning on compressor 12.

After step S23 is complete, the process may return to step S17 to determine if count value T of the timer is greater than predetermined value Ts. If the count value T is still less than predetermined time Ts, then the process repeats the steps of FIG. 6. However, if the count value T is greater than predetermined time Ts, then correction value $\beta$ is set to zero and the steps of FIG. 6 may be completed for a final processing.

If, however, it is determined that inner surface temperature Tg(t) of front windshield glass 17 may be greater than the threshold fogging prevention determination value controller 16 may proceed to the processing in step S24. Controller 16 may determine that there may be no possibility of occurrence of fogging on the window glass, and may set the fogging determination flag to the OFF state.

In step S25, controller 16 may output control signals to compressor 12 and actuator 13 and may stop the defogging operation if the fogging determination flag was previously set to the ON state. Or, alternatively, if the defogging operation was previously set to the OFF state, the fogging determination flag may remain in the OFF state.

Advantageously, as may be understood from the above explanation, under the defogging operation of this disclosure, controller 16 may determine whether or not temperature Tam of the outside air of the vehicle may be decreased by a value greater than the predetermined value. In a case where it may be determined that temperature Tam of the outside air of the vehicle may be decreased by a value greater than the predetermined value, controller 16 may set fogging prevention determination value Td+$\beta$ so as to determine earlier that there may be a possibility of occurrence of fogging on the window glass. As a result, it may be possible to suppress fogging of the window glass with a change in temperature Tam of the outside air of the vehicle and ensure visibility.

Further, under the defogging operation in this exemplary embodiment, controller 16 may determine whether or not temperature Tam of the ambient air outside of the vehicle may be decreased by the value greater than the predetermined value when the vehicle may be started to shift from a stopped state to a running state. As a result, it may be possible to suppress occurrence of such an error that the defogging operation may be started in response to a drop in the ambient air temperature outside the vehicle which may be caused by operation of a radiator cooling fan during idling of the vehicle.

Further, under the defogging operation as described herein, controller 16 may set the fogging prevention determination value by adding correction value $\beta$, which may be determined on the basis of a difference in heat resistance between the front windshield glass and the door glass of the vehicle, to the determined dew-point value. As a result, it may be possible to suppress fogging of the door glass that may be disposed within a visibility region of the side mirror and may tend to undergo the fogging, preceding fogging of the front windshield glass.

Further, under the defogging operation as described herein, in a case where a rate of change (a rate of decrease) in inner surface temperature Tg(t) of front windshield glass 17 may be greater than a predetermined value, controller 16 may correct the fogging prevention determination value. Therefore, it may be possible to suppress an error in determination of fogging.

Further, under the defogging operation as described herein, in a case where it may be determined that the engine coolant temperature may be less than a predetermined temperature, controller 16 may determine whether or not the temperature of the ambient air outside of the vehicle may be decreased by the value greater than the predetermined value. Therefore, it may be possible to suppress an error in determination of fogging.

Further, under the defogging operation as described herein, controller 16 may reset the fogging prevention determination value to a value in the ordinary state in response to lapse of predetermined time Ts that may be set in accordance with temperature Tam of the outside air of the vehicle. In general, as temperature Tam of the ambient air outside of the vehicle may become lower, the time that may be taken to achieve a convergence of the temperature difference between the front windshield glass and the door glass in the vehicle running state and a convergence of the temperature difference between the front windshield glass and the door glass in the vehicle stopped state may be increased. Therefore, due to the above defogging operation as described herein, a correction time may be appropriately set to thereby suppress erroneous determination of occurrence of fogging.

Modifications and variations of the embodiment described above may occur to those skilled in the art in light of the above disclosure. For instance, correction value $\beta$ may be subtracted from detected inner surface temperature Tg(t) instead of being added to dew-point temperature Td(t) (threshold value of fogging prevention determination). Due to such a correction, the presence of a possibility of occurrence of fogging on the window glass may be determined earlier.

Further, one skilled in the art may recognize modifications of the present operation, such as omitting the steps of determining the engine coolant temperature or the vehicle speed, without deviating from the scope of the present disclosure.

Additionally, as noted above, this system advantageously allows a vehicle to prevent fogging of windows prior to impairment of visibility to a driver. The system allows for operation during initial start-up of the vehicle, and may be effective when driving a vehicle from a garage into the open air, where a sudden temperature difference may be present, so that fogging of windows may occur. Further, the present system may be effective when a driver is operating a vehicle in a tunnel, and after leaving the tunnel, there is a sudden change in the temperature so that fogging of windows may occur. Further, the present system may be effective when a driver experiences a sudden change in the weather, wherein fogging of the windows may occur due to changes in the temperature or humidity conditions.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. An air conditioning system of a vehicle, comprising:
a controller; and
a plurality of sensors in communication with the controller, wherein:
the plurality of sensors includes an interior temperature sensor for a vehicle interior and an inner surface temperature sensor for a windshield,
the controller is configured to determine a dew-point for the vehicle interior based on the sensed interior temperature,
the controller is further configured to calculate an adjusted dew-point value that is the sum of the dew-point and a correction value, and
the controller is further configured to perform a defogging operation when the inner surface temperature is less than the adjusted dew-point value,
wherein the correction value is adjusted based on the difference between a heat resistance of the windshield and a heat resistance of a vehicle door glass.

2. The air conditioning system of a vehicle of claim 1, wherein the defogging operation comprises at least one of:
adjusting the vehicle interior temperature;
changing an air conditioning mode to a defroster mode;
increasing a rotational speed of a blower fan to increase an amount of output from a plurality of defroster vents;
increasing a temperature of air blown from the plurality of defroster vents;
changing an air flow configuration from recirculation to introduction of outside ambient air; and
blowing dehumidified air out of the plurality of defroster vents.

3. The air conditioning system of a vehicle of claim 1, wherein:
the plurality of sensors includes a vehicle speed sensor,
the controller is further configured to determine if the vehicle is in a stopped state or a moving state based on the vehicle speed, and
the controller is further configured to determine whether the inner surface temperature is less than the adjusted dew-point when the vehicle is shifted from the stopped state to the moving state.

4. The air conditioning system of a vehicle of claim 1, wherein:
the controller is further configured to determine a rate of change of the interior temperature, and
the controller is further configured to adjust the correction value when the determined rate of change of the vehicle interior temperature is greater than a predetermined vehicle interior rate of change value.

5. The air conditioning system of a vehicle of claim 1, wherein:
the plurality of sensors includes an engine coolant temperature sensor, and
the controller is further configured to determine whether the inner surface temperature is less than the adjusted dew-point when the sensed engine coolant temperature is less than a predetermined engine coolant value.

6. An air conditioning system of a vehicle, comprising:
a controller; and
a plurality of sensors in communication with the controller, wherein:
the plurality of sensors includes an interior temperature sensor for a vehicle interior and an inner surface temperature sensor for a windshield,
the controller is configured to determine a dew-point for the vehicle interior based on the sensed interior temperature,
the controller is further configured to calculate an adjusted dew-point value that is the sum of the dew-point and a correction value, and
the controller is further configured to perform a defogging operation when the inner surface temperature is less than the adjusted dew-point value,
wherein: the plurality of sensors includes an outside temperature sensor for an outside ambient air,
the controller is further configured to determine a rate of change of the outside temperature, and
the controller is further configured to determine whether the inner surface temperature is less than the adjusted dew-point when the determined rate of change of the outside temperature is greater than a predetermined outside temperature rate of change value.

7. The air conditioning system of a vehicle of claim 6, wherein the defogging operation comprises at least one of:
adjusting the vehicle interior temperature;
changing an air conditioning mode to a defroster mode;
increasing a rotational speed of a blower fan to increase an amount of output from a plurality of defroster vents;
increasing a temperature of air blown from the plurality of defroster vents;
changing an air flow configuration from recirculation to introduction of outside ambient air; and
blowing dehumidified air out of the plurality of defroster vents.

8. The air conditioning system of a vehicle of claim 6, wherein:
the plurality of sensors includes a vehicle speed sensor,
the controller is further configured to determine if the vehicle is in a stopped state or a moving state based on the vehicle speed, and
the controller is further configured to determine whether the inner surface temperature is less than the adjusted dew-point when the vehicle is shifted from the stopped state to the moving state.

9. The air conditioning system of a vehicle of claim 6, wherein:
the controller is further configured to determine a rate of change of the interior temperature, and
the controller is further configured to adjust the correction value when the determined rate of change of the vehicle interior temperature is greater than a predetermined vehicle interior rate of change value.

10. The air conditioning system of a vehicle of claim 6, wherein:
the plurality of sensors includes an engine coolant temperature sensor, and
the controller is further configured to determine whether the inner surface temperature is less than the adjusted dew-point when the sensed engine coolant temperature is less than a predetermined engine coolant value.

11. An air conditioning system of a vehicle, comprising:
a controller; and
a plurality of sensors in communication with the controller, wherein:
the plurality of sensors includes an interior temperature sensor for a vehicle interior and an inner surface temperature sensor for a windshield,
the controller is configured to determine a dew-point for the vehicle interior based on the sensed interior temperature, the controller is further configured to calculate an adjusted dew-point value that is the sum of the dew-point and a correction value, and the controller is further configured to perform a defogging operation when the inner surface temperature is less than the adjusted dew-point value, wherein:

the controller is further configured to count time, and the correction value is set to zero after a predetermined time has elapsed.

12. The air conditioning system of a vehicle of claim 11, wherein the controller decreases the predetermined time as the outside ambient air temperature increases.

13. An air conditioning system of a vehicle, comprising:
a controller; and
a plurality of sensors in communication with the controller, the plurality of sensors comprising:
a means for sensing a temperature of an interior of the vehicle, and
a means for sensing an inner surface temperature of a windshield of the vehicle, wherein:
the controller is configured to determine a dew-point of the interior of the vehicle from the sensed interior temperature,
the controller is further configured to calculate an adjusted dew-point value that is the sum of the dew-point and a correction value, and
the controller is further configured to perform a defogging operation when the inner surface temperature is less than the adjusted dew-point value,
wherein the correction value is adjusted at least partially based on the difference between the heat resistance of the windshield and the heat resistance of a vehicle door glass.

14. The air conditioning system of a vehicle of claim 13, wherein the defogging operation includes at least one of:
adjusting the vehicle interior temperature;
changing an air conditioning mode to a defroster mode;
increasing a rotational speed of a blower fan to increase an amount of output from a plurality of defroster vents;
increasing a temperature of air blown from the plurality of defroster vents;
changing an air flow configuration from recirculation to introduction of outside ambient air; and
blowing dehumidified air out of the plurality of defroster vents.

* * * * *